United States Patent [19]
Gardetto

[11] Patent Number: 6,109,319
[45] Date of Patent: Aug. 29, 2000

[54] RUN-FLAT SUPPORT FOR PNEUMATIC TIRED WHEEL

[76] Inventor: William W. Gardetto, 3511 Brentwood Dr., Bedford, Tex. 76021

[21] Appl. No.: 08/918,056

[22] Filed: Aug. 25, 1997

Related U.S. Application Data

[63] Continuation-in-part of application No. 08/518,983, Aug. 24, 1995, Pat. No. 5,660,653.

[51] Int. Cl.$^7$ .................................................. B60C 17/01
[52] U.S. Cl. ...................................... 152/520; 152/381.4
[58] Field of Search ..................... 152/516, 520, 152/379.3, 379.4, 379.5, 381.3, 381.4, 381.5, 381.6

[56] References Cited

U.S. PATENT DOCUMENTS

| | | | |
|---|---|---|---|
| T963,004 | 10/1977 | Van Wicklin, Jr. | 152/520 X |
| 4,059,138 | 11/1977 | Mirtain et al. | 152/330 |
| 4,157,107 | 6/1979 | Cataldo | 152/330 |
| 4,169,496 | 10/1979 | Cataldo | 152/379.1 |
| 4,183,388 | 1/1980 | Cassidy | 152/158 |
| 4,202,393 | 5/1980 | Ikeda et al. | 152/330 |
| 4,257,467 | 3/1981 | Van der Burg | 152/158 |
| 4,281,700 | 8/1981 | Ross | 152/158 |
| 4,346,747 | 8/1982 | Osada et al. | 152/520 X |
| 4,428,411 | 1/1984 | Markow et al. | 152/330 |
| 4,573,509 | 3/1986 | Smith et al. | 152/158 |
| 4,673,014 | 6/1987 | Markow | 152/156 |
| 4,681,147 | 7/1987 | Hugele | 152/520 X |
| 4,794,966 | 1/1989 | Markow | 152/516 |
| 4,823,854 | 4/1989 | Payne et al. | 152/382 |
| 5,012,849 | 5/1991 | Ko | 152/520 |

FOREIGN PATENT DOCUMENTS

| | | | |
|---|---|---|---|
| 971605 | 7/1975 | Canada | 152/520 |
| 226967 | 7/1987 | European Pat. Off. | 152/520 |
| 2610249 | 8/1988 | France | 152/520 |
| 251305 | 10/1988 | Japan | 152/520 |
| 2204841 | 11/1988 | United Kingdom | 152/520 |

OTHER PUBLICATIONS

"Throw Away the Spare", by Jim McCraw, *Popular Science*, May 1993, pp. 88, 89, 90 and 106.

*Primary Examiner*—Russell D. Stormer
*Attorney, Agent, or Firm*—Dennis T. Griggs

[57] ABSTRACT

A tire is supported in a deflated or run-flat condition by curved, tubular support segments. End portions of adjacent support segments include complementary male and female portions disposed in mating engagement when installed on a wheel in the run-flat operative position. The mating end portions maintain alignment of the support segments during installation and oppose lateral deflection of the segments relative to the wheel in response to side impact forces imposed on the tire during run-flat operation. Each support segment includes a smooth crown portion centered between two shoulder portions and separated from the shoulder portions by a pair of annular grooves or pockets. During run-flat turning and cornering movement, tire tread material is pressed into one of the annular grooves, thus centering the tire on the support segment, thereby opposing lateral shifting movement of the tire tread relative to the support segment and distributing load forces uniformly across the tire tread. The curved support segments include transverse sidewalls arranged generally in a tubular structure having the form of a pentagon in cross-section profile for reacting load forces during run-flat operation.

18 Claims, 8 Drawing Sheets

RUN-FLAT SUPPORT FOR PNEUMATIC TIRED WHEEL

BACKGROUND OF THE INVENTION

This application is a continuation-in-part of Ser. No. 08/518,983 filed Aug. 24, 1995, now U.S. Pat. No. 5,660,653.

This invention is generally related to pneumatic tires for motor vehicles, and in particular to an internal rim support assembly for supporting a tire in a deflated and run-flat condition.

Pneumatic tired wheels are widely used on virtually all types of land vehicles, including automobiles, trucks, trailers, tractors, other self-propelled and unpowered vehicles and aircraft landing gear. Intensive development activities involving pneumatic tired wheels and tires have resulted in a highly developed state of the art with respect to tire design, including the development of tubeless tires and radial tires which allow substantial deflection of the tire sidewall during normal operation to improve vehicle handling performance, cushion the vehicle against road imperfections, improve vehicle operating efficiency and lengthen tire life by reducing friction caused by tire deflection.

A substantial limitation on the performance of pneumatic or gas medium charged tires is directly caused by the loss of inflation pressure. Various attempts have been made to eliminate loss of tire pressure due to tire wall puncture and provide tire designs that will enable the tire to continue to operate in a deflated or "run-flat" condition. Of course, conventional pneumatic tires, if deflated, cause substantial loss of vehicle control and both tire and wheel damage quickly result from continued operation.

Efforts have been directed at developing tires with sidewall and tread reinforcements and wheel rim configurations which permit tires to operate in the run-flat condition. These efforts have only been partially successful and still result in reduced vehicle stability and control and undesirable changes in traction and handling due to changes in effective wheel diameter and tire deflection. Moreover, run-flat tires have been developed for the purpose of eliminating the need for a spare tire on board the vehicle and the problems associated with changing flat tires under hazardous on-the-road conditions as well as the desire to eliminate the problems associated with the space required in the vehicle for storing a spare tire and the associated tire changing tools.

Accordingly, considering the problems associated with providing conventional spare tires and tools and the limitations imposed by self-sealing and conventional run-flat tire designs, there is considerable interest in providing vehicle wheels with improved run-flat support devices that may be installed within the wheel-tire pressure chamber and which support the tire in a seriously under-inflated, deflated or run-flat condition.

The problems associated with self-sealing tires to minimize pressure loss and efforts to design tires which will operate in a deflated or run-flat condition have prompted the development of support devices which may be installed on a pneumatic tired wheel within the tire pressure chamber to support the tire when it is partially or completely deflated without substantially reducing the wheel effective diameter so that vehicle stability and control are not compromised and the vehicle can be operated for an extended period of time in the run-flat condition. Devices have been developed that include single and multi-part cushion members which are disposed on the wheel rim between the tire bead flanges and extend radially outward from the wheel axis of rotation to support the tire in a deflated condition.

Some of these conventional run-flat devices have been fabricated of resilient elastomeric materials of relatively complex construction and may be stretched over the wheel rim to mount on unitary rims. These devices, if stiff enough to support a tire in a run-flat condition, are difficult to mount on one piece rims due to the difference in diameter between the tire bead flanges and the interconnecting rim center portion or web. On the other hand, if these devices are made resilient enough to be slipped over the bead flanges and engaged with the wheel rim in a static condition, they tend to lose their support position during high wheel speed due to centrifugal forces acting thereon.

Additionally, single and multi-part, substantially rigid, annular or toroidal support devices have been developed for mounting on pneumatic tired wheel rims, particularly multi-part rims wherein there is no requirement that the diameter of the support device change during the mounting procedure since it is not necessary to provide for slipping the device over the larger diameter tire bead flange and then be adapted to engage the smaller diameter rim web.

A substantial number of relatively light duty vehicle wheel configurations are characterized by one piece or welded multi-part wheel structures that cannot be disassembled to provide access to the smaller diameter rim web or center portion for mounting a conventional run-flat support device. Conventional devices for supporting pneumatic tires in a run-flat condition have not been properly adapted for mounting on a rim which has a tire bead flange of a larger diameter than the rim web portion between the bead flanges.

The present invention has been developed for providing a support device for use in combination with a pneumatic tired wheel to permit safe operation of the wheel in a run-flat condition of the tire without significant loss of vehicle stability or control, while providing adequate tractive effort of the wheel with the tire in the run-flat condition and to substantially avoid tire destruction or damage while being operated in the under-inflated or run-flat condition for extended periods.

BRIEF SUMMARY OF THE INVENTION

The present invention provides an improved support device for a pneumatic tired wheel for supporting a pneumatic tire in an under-inflated, deflated or run-flat condition. The run-flat assembly is particularly adapted for installation on a substantially one piece or fixed wheel having a circular rim or web portion interposed between opposed tire bead flanges.

In accordance with one aspect of the present invention, a multi-segment run-flat support assembly is provided for mounting on a pneumatic tired wheel and adapted to be installed between flanges of the wheel which support the circular pneumatic tire beads. In the preferred embodiment, the support assembly includes two or more curved support segments each including transverse sidewalls for engaging the wheel and a crown sidewall for engaging the tire tread inner wall to support the tire in an under-inflated, deflated, or partially reduced diameter operating condition, which will provide suitable vehicle stability and control and suitable tractive capability under run-flat conditions.

End portions of adjacent support segments include complementary male and female portions disposed in mating engagement when installed in the run-flat operative position on the wheel. The mating end portions assist in proper location and alignment of the support segments during installation, and also stabilize and help maintain alignment of the support segments in response to side impact forces directed against the tire during run-flat operation. The mating end portions further provide uniform load distribution against the tire and smooth running response during run-flat operation.

The present invention further provides a multi-segment run-flat support assembly for mounting on a pneumatic tired vehicle wheel which includes a unique crown configuration for preventing lateral shifting movement of the tire relative to the wheel during turning and cornering maneuvers under run-flat conditions. Each run-flat support segment includes a smooth crown portion disposed between two shoulder portions, with the crown portion being separated from the shoulder portions by circumferential grooves or recesses. During run-flat turning and cornering movement, tire tread material is pressed into one of the grooves, thus preventing lateral shifting movement of the tire tread relative to the support segment.

Still further, the support segments of the tire support device are substantially tubular in form and include transverse sidewalls that can be mounted on various types of conventional one piece, fixed or multi-part wheel rims and suitably secured thereto by threaded bolt fasteners as OEM equipment or by add-on retrofit installation. Each transverse sidewall is arranged generally in the form of a five-sided tubular segment that is curved and open-ended. The tubular, transverse sidewall arrangement reacts run-flat load forces uniformly and substantially without deforming the tubular segment.

The foregoing features and advantages of the run-flat tire support device of the present invention will be understood by those skilled in the art upon reading the detailed description which follows with reference to the drawings, wherein:

DETAILED DESCRIPTION OF THE INVENTION

In the description which follows, like parts are marked throughout the specification and drawing with the same reference numerals, respectively. The drawing figures are not necessarily to scale in the interest of clarity and conciseness.

Figure 1:
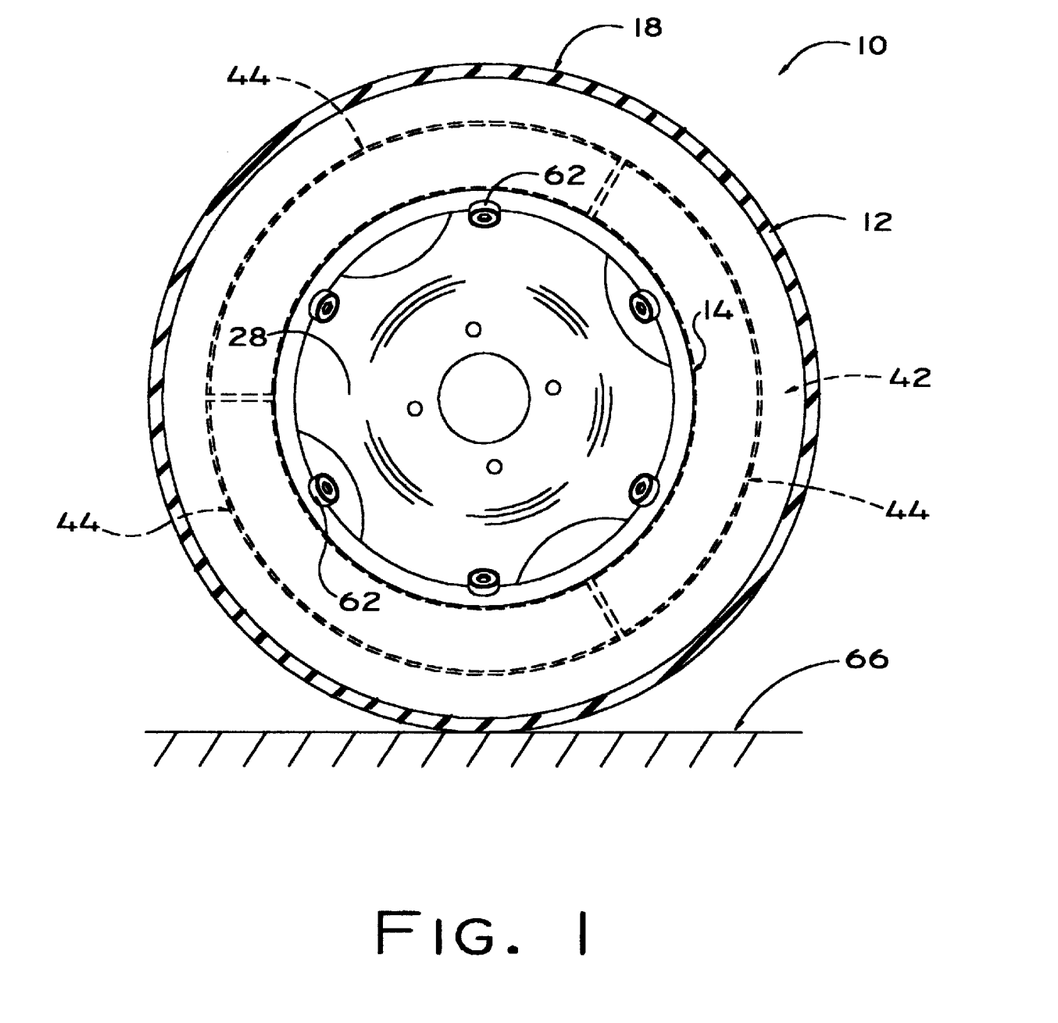
FIG. 1 is a side elevational view of the multi-segment run-flat support assembly of the present invention mounted in the operative position on a pneumatic tired wheel.
Figure 7:
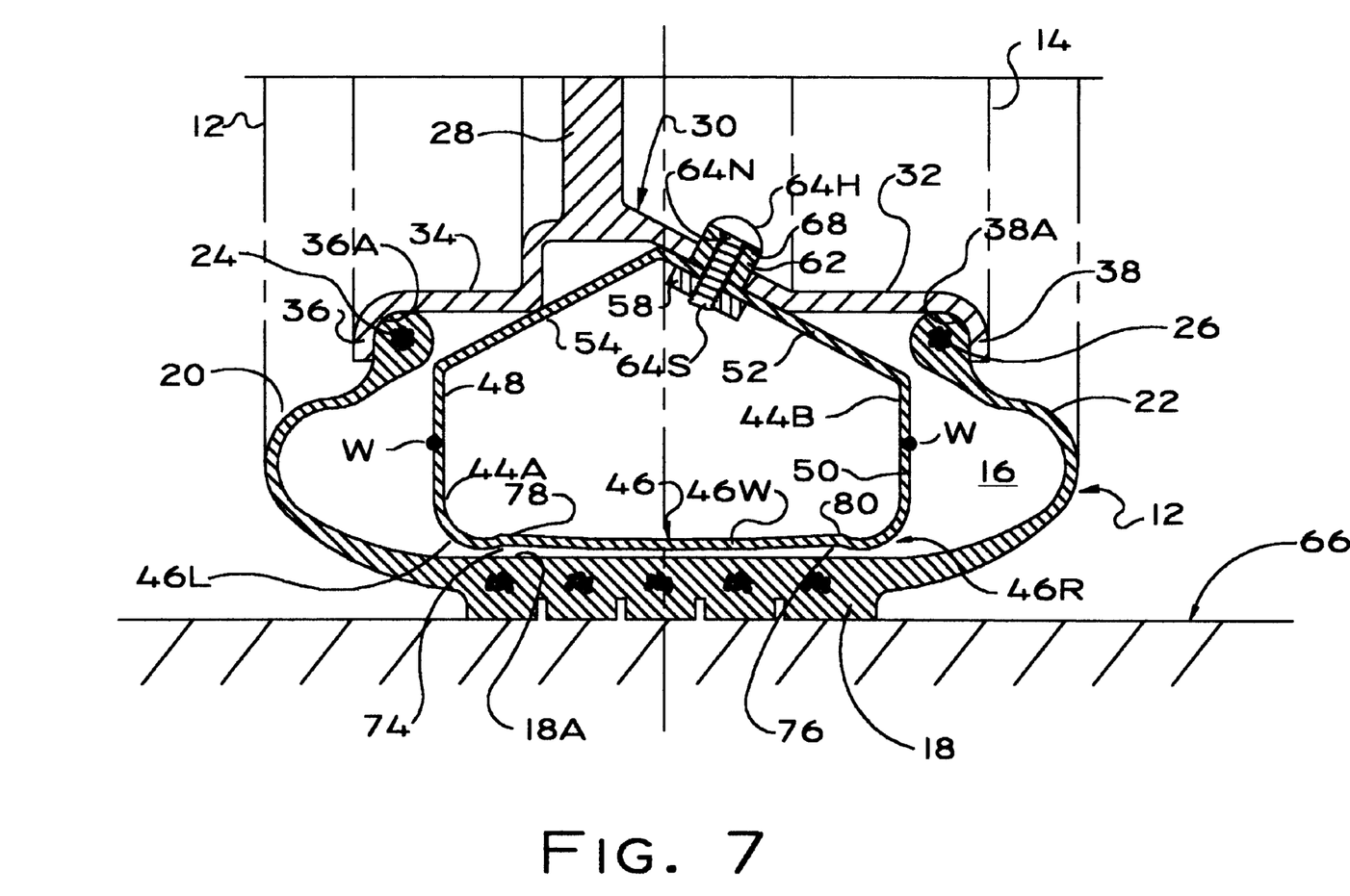
FIG. 7 is a sectional view of the pneumatic tired wheel of FIG. 1 showing a support segment in run-flat engagement with a tire tread.
Figure 9:
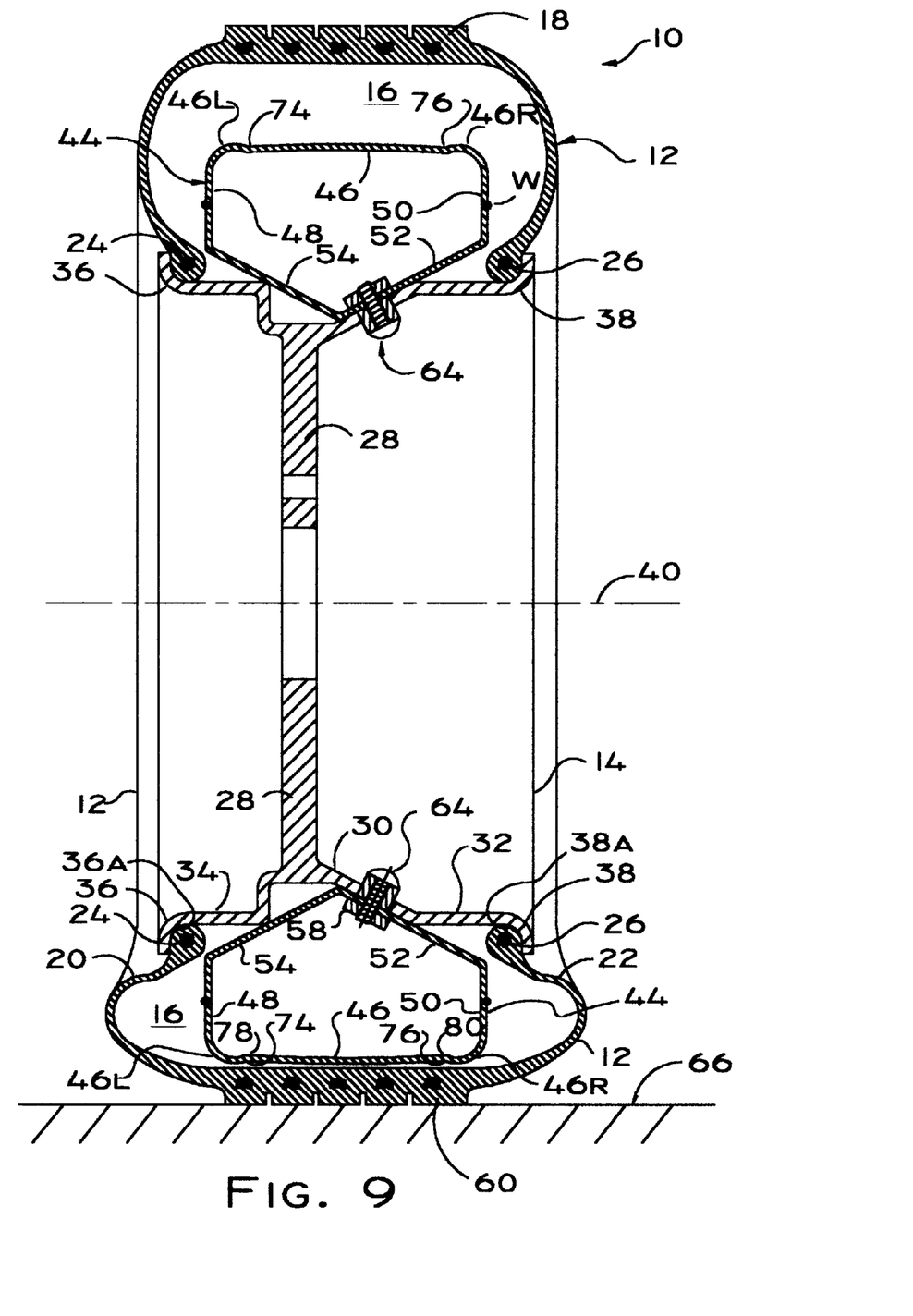
FIG. 9 is a sectional view of the tire of FIG. 1 in the run-flat condition.

Referring to FIGS. 1, 7 and 9, there is shown a conventional pneumatic tired wheel assembly, generally designated by the numeral 10, which has been modified to include the unique run-flat tire support assembly of the present invention. The wheel assembly 10 includes a conventional pneumatic tire 12 supported on a substantially rigid wheel 14 and forming an annular inflation space or chamber 16. In FIG. 7 and FIG. 9, the tire 12 is shown in a condition wherein the gas pressure in the wheel tire pressure chamber 16 is reduced enough to permit the tire to operate in the run-flat condition. The tire 12 is of conventional design and may be either a bias ply or radial type. The tire 12 includes a circular, circumferential tread part 18, opposed sidewalls 20 and 22 integrally formed with the tread part 18 and delimited by radially inwardly disposed circumferential bead portions 24 and 26, respectively.

The wheel 14 is of substantially conventional construction and includes a central, circular disk hub portion 28 adapted to be mounted on a conventional vehicle rotatable wheel hub, not shown. A circumferential circular rim 30 of wheel 14 includes opposed generally laterally extending webs 32 and 34 on opposite sides of the hub 28 and each being delimited by radially outwardly disposed circumferential tire bead flanges 36 and 38, respectively. The flanges 36 and 38 include curved surfaces 36A and 38A configured to be in sealing and supportive engagement with the tire bead portions 24 and 26, respectively, to prevent loss of pressurized air from the inflation chamber 16.

Those skilled in the art will recognize that the center rim 30 may take different cross-sectional configurations. However, typically the rim 30, including the web portions 32 and 34, is of a smaller diameter with respect to the wheel central axis of rotation 40, FIG. 9, than the flanges 36 and 38, and smaller in particular than the outermost edges of the flange 36 and 38.

Although the wheel 14 is shown having integral hub and rim portions 28 and 30, those skilled in the art will recognize that the present invention may be used in conjunction with fixed multiple-piece welded or riveted rims or separable wheel rims of various designs. The run-flat support assembly of the invention is particularly advantageous in that it may be mounted on fixed or integral rims of the type including bead flanges 36 and 38 that are not separable from each other or from the rim 30.

Figures 2, 3:
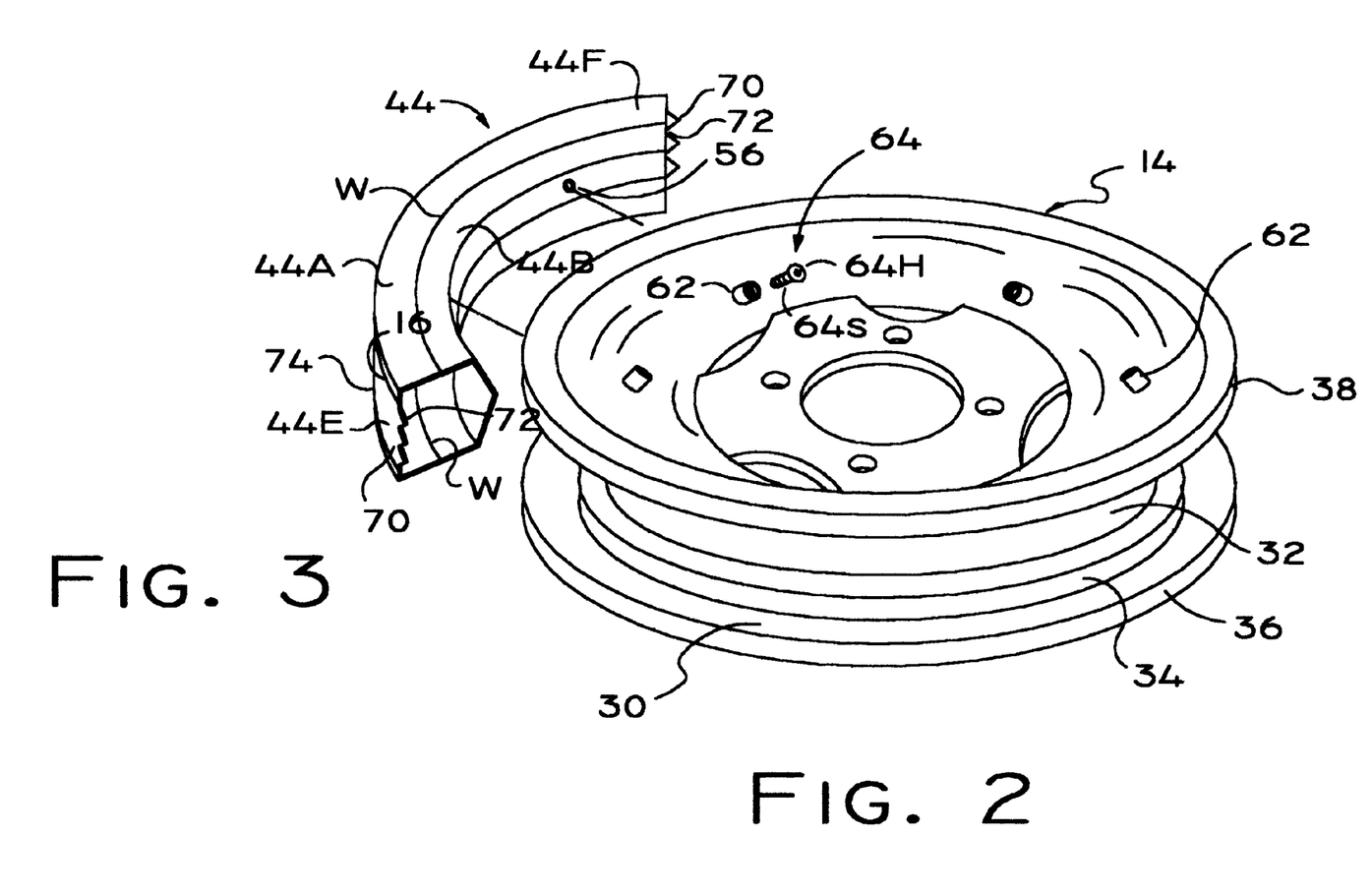
FIG. 2 is a perspective view of a wheel including integral hub and rim portions and threaded coupling members for attaching the run-flat support segments of the present invention.
FIG. 3 is a perspective view showing a run-flat support segment positioned for mounting on the wheel rim of FIG. 2.

Referring now to FIG. 1, FIG. 2 and FIG. 3, the run-flat support assembly of the invention is illustrated and generally designated by the numeral 42. The support assembly 42 includes opposed, end coupled, semi-circular support segments 44 of substantially identical construction. Each segment 44 is characterized by a substantially semi-cylindrical tire support crown web portion 46, opposed radially inwardly extending generally parallel sidewall flanges 48 and 50, a first coupling web 52 for attachment to the rim 30 in the run-flat operative position as shown in FIG. 7 and FIG. 9, and a second coupling web 54 attached to the first coupling web and extending transversely with respect thereto, and engaging the lateral rim web 34.

Figure 6:
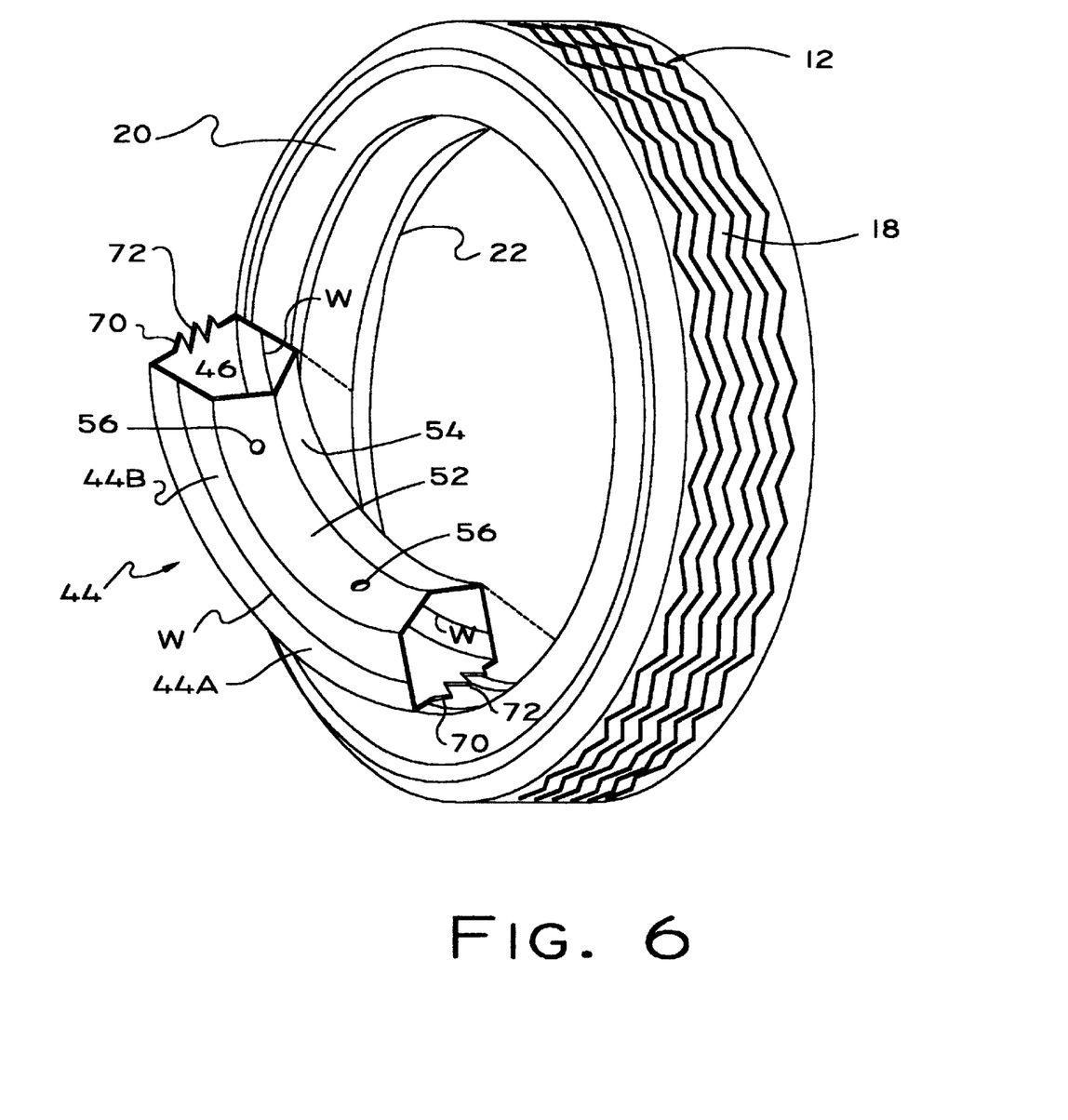
FIG. 6 is a perspective view showing a run-flat support segment being inserted within the inflation chamber of a tire.

Preferably, each segment 44 includes first and second body portions 44A, 44B that are welded together along weld lines W as shown in FIG. 3 and FIG. 6, thereby forming an open-ended, tubular support structure. The segments 44 may be formed of a suitable engineering material such as steel, aluminum or a high strength reinforced plastic. In the preferred embodiment, the crown web 46, the sidewall flanges 48, 50 and the coupling webs 52, 54 are interconnected and arranged generally in a tubular structure having the form of a pentagon in cross-section profile for reacting load forces during run-flat operation. The body sections 44A, 44B are prefabricated and are conformed for concave nesting engagement within the curvature of the rim 30. When the body sections 44A and 44B are welded together along the weld lines W, the webs and sidewalls define a mechanical box section with all peripheral surfaces being connected without a break.

Figure 8:
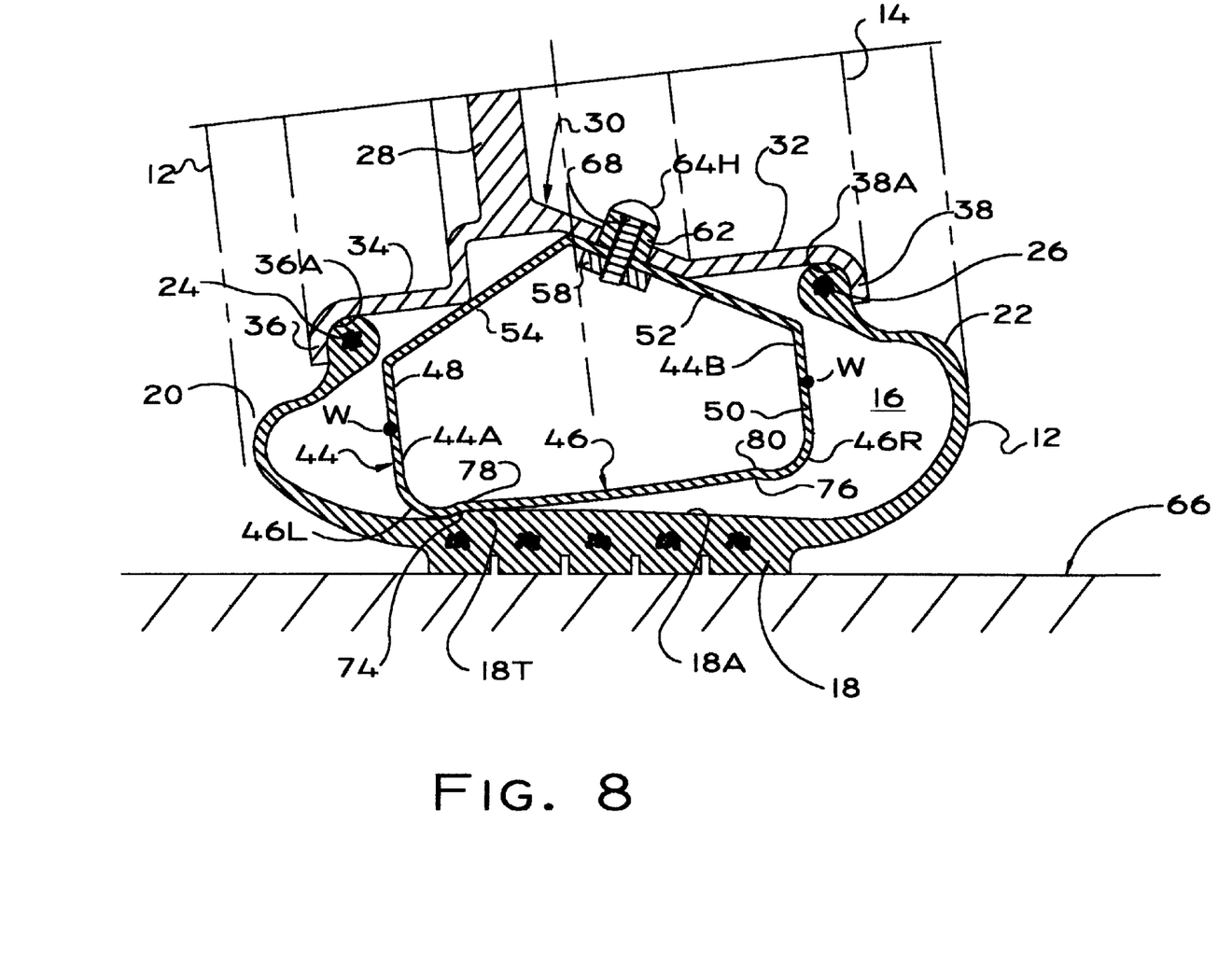
FIG. 8 is a view similar to FIG. 7 showing the interaction of the tire tread with the run-flat support segment in response to side loading imposed by a cornering maneuver.

Referring now to FIG. 6, FIG. 8 and FIG. 9, the coupling web 52 of body section 44B is intersected by a coupling aperture 56, and a threaded fastener nut 58 is welded to the underside of the coupling web 52 in registration with the aperture 56. The rim 30 is also intersected by a threaded coupling aperture 60 and receives a support bushing 62. A threaded bolt fastener 64 extends through the support bushing and is torqued into engagement with the nut fastener 58.

The wheel 14 is further modified to receive additional segments 44 of the run-flat support assembly 42 by the installation of plural support bushings 62 projecting radially through the rim 30 on the web portion 32, for example, as shown in FIG. 7. A suitable radial hole 56 may be bored in the web 34 and the bushing 62 welded in place by suitable airtight welds on the both the inner and outer surfaces of the web 34, as shown. The bushing 62 is preferably centered between the flanges 36 and 38 and is adapted to form a support for an elongated threaded bolt 64 having a socket head portion 64H and a threaded shank portion 64S.

A non-threaded cylindrical shank portion 64N extends between the head 64H and the threaded shank portion 64S. The non-threaded shank portion 64N is adapted for a close sliding fit in a bore formed through the bushing 62. A suitable elastomeric seal ring 68 is supported on the bushing 62 for engagement with a beveled edge portion of the head 64H to prevent leakage of pressurized air from the inflation space 16. As shown in FIG. 1, three sets of diametrically opposed bolts 64 and support bushings 62 are provided in the rim 30 for attaching three run-flat support segments 44 in the operative position. Opposed holes are drilled or otherwise formed in the rim web 32 to receive the bushings 62 and the bushings are welded in place in the positions shown in FIG. 1 for receiving the bolts 64.

FIG. 7 and FIG. 9 show the run-flat support assembly 42 disposed on the wheel 14 and in an operative run-flat working position wherein the tire 12 has been deflated. The portion of the tire tread 18 in contact with a roadway 66 forces the tread inner wall into engagement with the support crown 46 as the wheel rotates.

In the inflated condition of the tire 12 on the wheel 14 and without any load weight applied thereto the tire assumes a nominal radius with respect to the axis 40, as shown in FIG. 1. When the tire 12 is under a rated vehicle weight load, it assumes a position wherein the sidewalls deflect some and the tread 18 assumes a position at an intermediate reduced radius with respect to the axis 40. Finally, as shown in FIG. 9, when the tire 12 is substantially deflated, the sidewalls 20 and 22 deflect to a position wherein the tread 18 is at a further reduced radius with respect to the axis 40 and the crown 46 is engaged with the inner tread 18. Preferably, the run-flat working position diameter of the support assembly crown surface 46 should be about 80%–85% of the nominal diameter of an inflated but unloaded tire.

Figure 4:
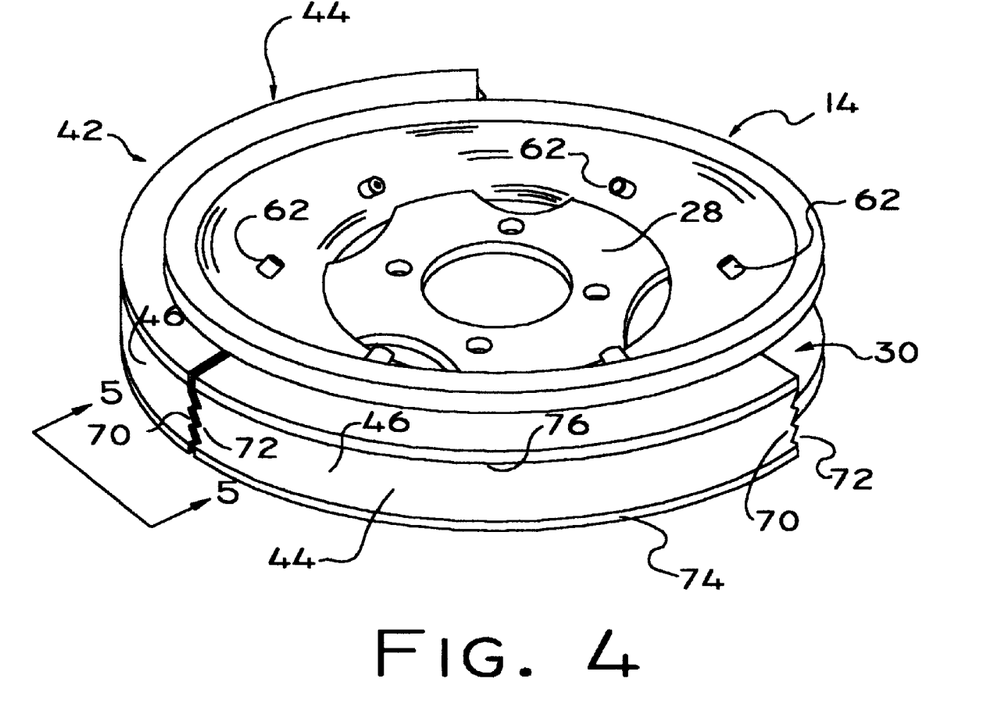
FIG. 4 is a perspective view of a wheel showing two run-flat support segments mounted on a circumferential rim portion of a wheel.
Figure 5:
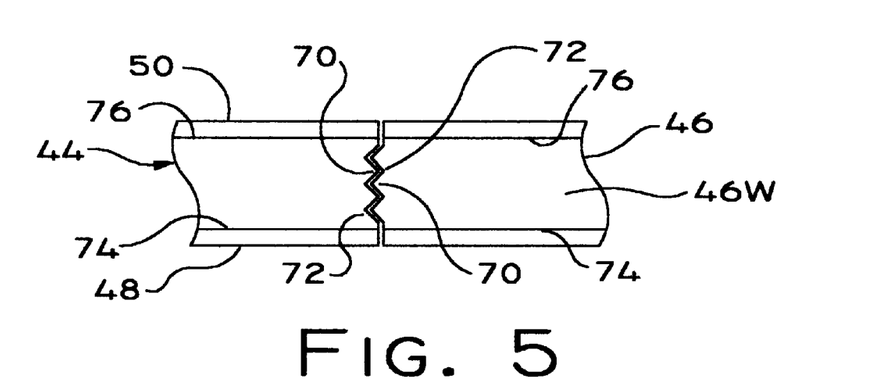
FIG. 5 is a side elevational view taken from the line 5—5 of FIG. 4, and partially broken away, showing mating engagement of adjacent end portions of the run-flat support segments.

It will be appreciated that the tire 12, when operated under-inflated or during run-flat conditions, is subjected to loading forces that tend to deflect the support segments relative to the wheel. In order to maintain true alignment of the support segments 44, the crown member of each support segment includes first and second end portions 44E, 44F, with the end portions including complementary male coupling members 70 and female coupling members 72. In the preferred embodiment, the male and female coupling members are arranged in a sawtooth coupling structure in which the male coupling member consists of a triangular tooth member projecting circumferentially from the first end portion of the crown member, and each female coupling member including a V-shaped notch or pocket extending circumferentially into the second end portion of each crown member. According to this arrangement, the notches or pockets of one support segment are disposed in mating engagement with the teeth of an adjacent support segment when the support segments are mounted on the rim in the end-to-end circumferentially arranged, operative position as shown in FIG. 1 and FIG. 4.

Figure 10:
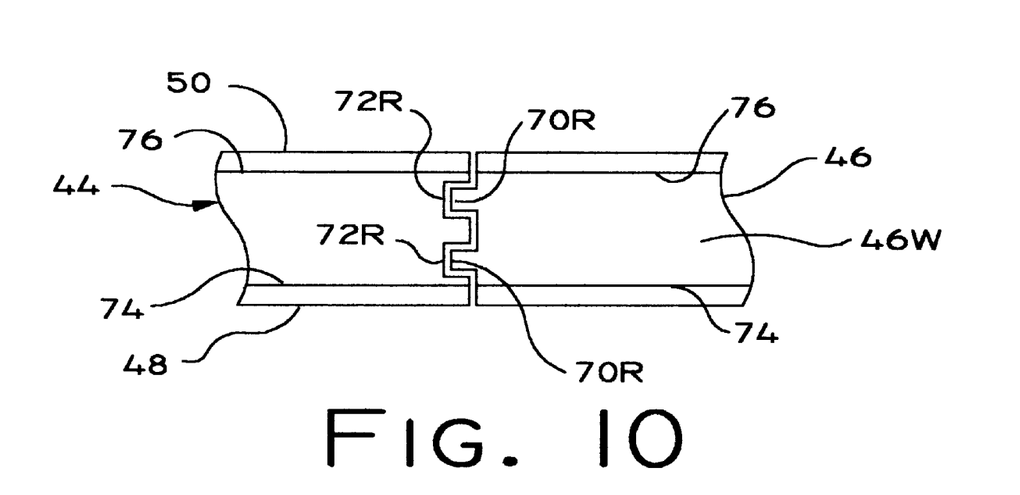
FIG. 10 is a side elevational view similar to FIG. 5 showing an alternative mating arrangement for adjacent end portions of the run-flat support segments; and, FIG. 11 is a side elevational view similar to FIG. 5 showing yet another alternative mating arrangement for adjacent end portions of the run-flat support segments.
Figure 11:
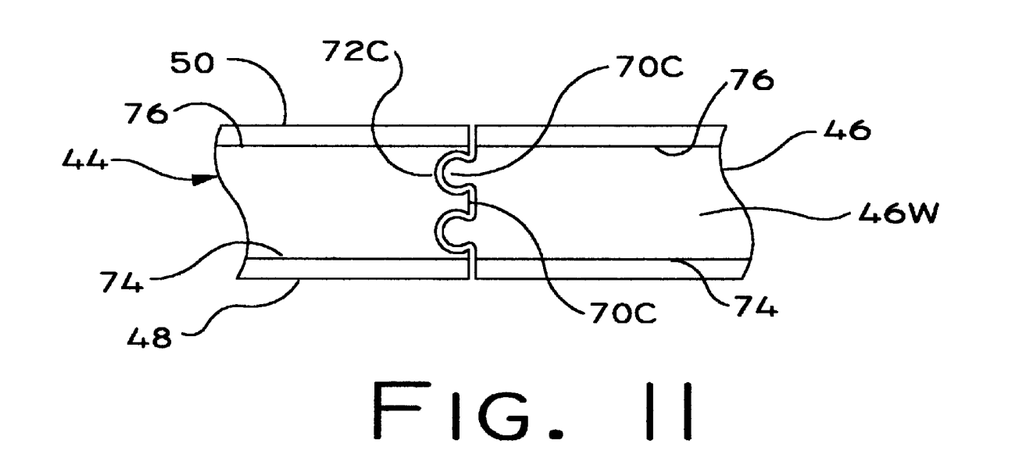

Alternative end mating arrangements are shown in FIG. 10 in which the male and female coupling members 70R, 72R have a rectangular form, and in FIG. 11 in which the male and female coupling members 70C, 72C have a cloverleaf profile. Preferably, the male and female coupling members alternate with each other on each end portion of the support segments.

Upon loss of inflation pressure within the wheel-tire pressure chamber 16, the sidewalls of the tire 12 undergo simultaneous compression and deformation due to side loading forces. These side loading forces cause lateral shifting movement of the tire relative to the wheel during turning and cornering maneuvers under run-flat conditions. To maintain alignment of the tire tread 18 with the support segment crown 46, each run-flat support segment includes a smooth crown web portion 46W disposed between two shoulder portions 46L and 46R. The crown portion 46W is separated from the shoulder portions 46L, 46R by circumferential grooves or recesses 74, 76, respectively.

During run-flat turning and cornering movement, tire tread material 18T, as shown in FIG. 8, is pressed into grooves 74, thus preventing lateral shifting movement of the tire tread relative to the support segment crown member 46. The grooves or pockets 74, 76 are laterally spaced apart on opposite sides of the crown member 46, and extend circumferentially along the support segment 44 between the crown web and the laterally opposite shoulders 46L, 46R, respectively.

Preferably, the circumferential grooves are formed by first and second intermediate web portions 78, 80 that are radially inset with respect to the crown web 46, thereby defining the first and second grooves or pockets 74, 76, respectively. When the support segments are assembled in end-to-end mating engagement with each other, they collectively form a substantially continuous circumferential crown support surface, with the circumferential grooves extending completely around the assembled support segments 44, for supporting and stabilizing the tire tread during run-flat operation.

The crown, shoulder portions and grooves form gripping means 52 that engage the inner wall 18A of the tire tread to prevent lateral or circumferential slippage of the tread with respect to the support segment 42 under either lateral forces exerted on the wheel 14 or tractive effort exerted by rotation of the wheel 14.

Fitting the support assembly 42 to a wheel is carried out with the tire 12 removed from the wheel. The support segments 44 are then inserted into the wheel-tire pressure space 16, as shown in FIG. 6, with three support segments 44 being arranged in end-to-end mating relation. The wheel 14 is then placed onto the tire and the tire sidewall bead 26 is inserted into the flange pocket 38A. The support segments 44 are then shifted circumferentially until the coupling apertures are in alignment and so that the bolts 64 may be threadedly engaged therewith upon sliding the bolts through the bushings 62. Upon tightening the bolts 64 against the fastener nuts 58, the coupling web 52 of the support segment 44 is brought into compression engagement with the rim web 32, as shown in FIG. 1 and FIG. 4.

After positioning the support segments 42 as described above and securing the support segment to the wheel, the tire 12 may be fully mounted on the wheel by forcing the tire bead 24 over the flange 36 so that it is disposed in the pocket 36A between the flanges 34 and 36. After the beads 24 and 26 are fully inserted into the pockets 36A, 38A, respectively, the tire is inflated to its rated pressure. The wheel assembly 10 is then ready to be mounted on a vehicle for normal use. Thanks to the construction of the run-flat support assembly 42, including the gripping means provided by the crown 46, the shoulders 46L, 46R and grooves 74, 76 formed thereby the tire 12 may be operated in a run-flat condition for an extended period of time. The run-flat support assembly 42 does not add a substantial amount of weight to the wheel assembly and may be constructed of conventional engineering materials as mentioned above.

Those skilled in the art will appreciate that the run-flat support assembly 42 may be advantageously retrofitted to existing one-piece or fixed multi-part wheels having opposed bead flanges and center rim portions arranged such that the rim portion has an effective outer diameter less than the diameter of the bead flanges, thereby precluding assembly of a one-piece as well as prior art multi-piece run-flat support devices to a conventional fixed or one-piece wheel. Additionally, the support assembly 42 may also be mounted on separable multi-part wheels if desired.

Although preferred embodiments of the invention have been described in detail herein, those skilled in the art will recognize that various substitutions and modifications may be made to the support segments and equivalents thereof without departing from the scope and spirit of the invention as recited in the appended claims.

What is claimed is:

1. A run-flat support assembly mountable onto the rim of a pneumatic tired wheel in an operative position for supporting a pneumatic tire in an under-inflated or deflated condition, said rim being intersected by a plurality of coupling apertures and said support assembly comprising:
   a plurality of support segments adapted for attachment to the rim of a pneumatic tired wheel in the operative position, each support segment including a crown member for engaging an inner wall of a pneumatic tire during run-flat operation;
   the crown member of each support segment including a first end portion and a second end portion, said end portions including complementary male and female coupling members, the male and female coupling members being disposed in end-to-end mating engagement with each other when the support segments are mounted on the rim in the operative position;
   each support segment including a coupling web for engaging the rim and a coupling aperture formed in the coupling web, the web aperture being aligned with one of the rim apertures in the operative position;
   a fastener bolt retainer disposed in alignment with the web aperture on each support segment; and,
   a threaded fastener bolt extending through an aligned pair of the coupling apertures and disposed in threaded engagement with the retainer on each support segment, respectively.

2. The run-flat support assembly set forth in claim 1,
   each male coupling member including a tooth projecting circumferentially from the first end portion of the crown member;
   each female coupling member including a notch or pocket extending circumferentially into the second end portion of the crown member; and,
   the notch or pocket of one support segment being disposed in mating engagement with the tooth of an adjacent support segment when the support segments are mounted on the rim in the operative position.

3. The run-flat support assembly set forth in claim 1,
   each support segment including a coupling web for attachment to the rim in the operative position and radially inwardly extending, spaced apart sidewalls interconnecting the coupling web and the crown member.

4. The run-flat support assembly set forth in claim 1,
   said crown member including a first shoulder, a second shoulder, a crown web disposed between the first and second shoulders, and first and second grooves or pockets formed in the crown member and extending circumferentially along the support segment between the crown web and the first and second shoulders, respectively.

5. The run-flat support assembly set forth in claim 1, said crown member including:
   first and second intermediate web portions interconnecting the crown web and the first and second shoulders, respectively, the intermediate web portions being radially inset with respect to the crown web, thereby defining said first and second grooves or pockets.

6. The run-flat support assembly set forth in claim 1,
   each support segment including a coupling web for attachment to the rim in the operative position and sidewalls interconnecting the coupling web and the crown member thereby defining a tubular support structure.

7. The run-flat support assembly set forth in claim 1,
   each support segment including a first coupling web for attachment to the rim in the operative position, a second coupling web coupled to the first coupling web and extending transversely with respect thereto, and first and second radially inwardly extending, spaced-apart sidewalls connecting the crown member to the first and second coupling webs, respectively, the coupling webs, sidewalls and crown member forming a tubular support structure having the general form of a pentagon in cross-section profile.

8. The run-flat support assembly set forth in claim 1, said wheel including spaced-apart tire bead engaging flanges and first and second annular rim portions disposed between said flanges, each support segment including:
   a first coupling web for attachment to the first annular rim portion, a second coupling web attached to the first coupling web and disposed for engagement with the second annular rim portion, and first and second radially inwardly extending, spaced apart sidewalls connecting the crown member to the first and second coupling webs, respectively.

9. The run-flat support assembly set forth in claim 1 wherein:

said support assembly comprises three substantially tubular segments, the crown members of the tubular segments being coupled together in end-to-end mating engagement with each other in the operative position, and each tubular segment including a coupling web for attachment to the rim when the support assembly is mounted in the operative position.

10. A run-flat support assembly mountable onto the rim of a pneumatic tired wheel in an operative position for supporting a pneumatic tire in an under-inflated or deflated condition, said support assembly comprising:

a plurality of support segments adapted for attachment to the rim of a pneumatic tired wheel in the operative position, each support segment including a crown member for enraging an inner wall of a pneumatic tire during run-flat operation;

the crown member of each support segment including a first end portion and a second end portion, said end portions including complementary male and female coupling members, the male and female coupling members being disposed in end-to-end mating engagement with each other when the support segments are mounted on the rim in the operative position; and, said male and female coupling members including a first sawtooth coupling structure formed on the first end portion of each crown member and a second sawtooth coupling structure formed on the second end portion of each crown member, the first sawtooth coupling structure including V-shaped pockets formed in the first end portion and teeth projecting circumferentially from the first end portion and alternating with the V-shaped pockets; and the second sawtooth structure including V-shaped pockets extending circumferentially into the second end portion and teeth alternating with the V-shaped pockets.

11. A run-flat support assembly mountable onto the rim of a pneumatic tired wheel in an operative position for supporting a pneumatic tire in an under-inflated or deflated condition, said support assembly comprising:

a plurality of support segments adapted for attachment to the rim of a pneumatic tired wheel in the operative position, each support segment including a crown member for engaging an inner wall of a pneumatic tire during run-flat operation; and said crown member including a first shoulder, a second shoulder, a crown web disposed between the first and second shoulders, and first and second grooves or pockets formed in the crown member and extending circumferentially along the support segment between the crown web and the first and second shoulders, respectively.

12. The run-flat support assembly set forth in claim 11, said crown member including:

first and second intermediate web portions interconnecting the crown web and the first and second shoulders, respectively, the intermediate web portions being radially inset with respect to the crown web, thereby defining said first and second annular grooves or pockets.

13. The run-flat support assembly set forth in claim 11, each support segment including a coupling web for attachment to the rim in the operative position, and including sidewalls interconnecting the coupling web and the crown member thereby defining a tubular support structure.

14. The run-flat support assembly set forth in claim 11, each support segment including a first coupling web for attachment to the rim in the operative position, a second coupling web coupled to the first coupling web and extending transversely with respect thereto, and first and second radially inwardly extending, spaced-apart sidewalls connecting the crown member to the first and second coupling webs, respectively; and, the coupling webs, sidewalls and crown member forming a tubular support structure having a cross-section generally in the form of a pentagon.

15. The run-flat support assembly set forth in claim 11, each support segment including a coupling web for engaging the rim in the operative position and including a threaded fastener nut and coupling aperture;

said wheel including a support bushing extending through the rim and through the coupling aperture of the coupling web; and, a threaded bolt fastener extending through the bushing and engaging the fastener nut.

16. The run-flat support assembly set forth in claim 11 wherein:

said support assembly comprises three substantially tubular segments, the crown members of the tubular segments being coupled together in end-to-end mating engagement with each other in the operative position, and each tubular segment including a coupling web attachable to the rim when the support assembly is mounted in the operative position.

17. A run-flat support assembly mountable onto the rim of a pneumatic tired wheel in an operative position for supporting a pneumatic tire in an under-inflated or deflated condition, said support assembly comprising:

a plurality of support segments adapted for attachment to the rim of a pneumatic tired wheel in the operative position, each support segment including a crown member for engaging an inner wall of a pneumatic tire during run-flat operation;

each support segment including a coupling web for attachment to the rim in the operative position, and including spaced apart sidewalls interconnecting the coupling web and the crown member thereby defining a tubular support structure;

each support segment including a first coupling web for attachment to the rim in the operative position, and a second coupling web coupled to the first coupling web and extending transversely with respect thereto;

said spaced-apart sidewalls connecting the crown member to the first and second coupling webs, respectively; and, the coupling webs, sidewalls and crown member forming a tubular support structure having a cross-section profile generally in the form of a pentagon.

18. The run-flat support assembly set forth in claim 17, said wheel including spaced-apart tire bead engaging flanges and first and second annular rim portions disposed between said flanges, each support segment including:

a first coupling web for attachment to the first annular rim portion, a second coupling web attached to the first coupling web and disposed for engagement with the second annular rim portion in the operative position, and the first and second radially inwardly extending, spaced apart sidewalls connecting the crown member to the first and second coupling webs, respectively.

* * * * *